United States Patent
Damera Venkata et al.

(10) Patent No.: US 10,482,173 B2
(45) Date of Patent: Nov. 19, 2019

(54) QUALITY DISTRIBUTIONS FOR AUTOMATED DOCUMENT

(71) Applicant: Hewlett-Packard Development Company, L.P., Fort Collins, CO (US)

(72) Inventors: Niranjan Damera Venkata, Chennai (IN); Ildus Ahmadullin, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 335 days.

(21) Appl. No.: 14/900,592

(22) PCT Filed: Jun. 28, 2013

(86) PCT No.: PCT/US2013/048727
§ 371 (c)(1),
(2) Date: Dec. 21, 2015

(87) PCT Pub. No.: WO2014/209387
PCT Pub. Date: Dec. 31, 2014

(65) Prior Publication Data
US 2016/0140102 A1    May 19, 2016

(51) Int. Cl.
*G06F 17/24* (2006.01)
*G06F 17/21* (2006.01)

(52) U.S. Cl.
CPC ............ *G06F 17/248* (2013.01); *G06F 17/21* (2013.01)

(58) Field of Classification Search
CPC ...................................................... G06F 17/24
See application file for complete search history.

(56) References Cited

U.S. PATENT DOCUMENTS

| | | | |
|---|---|---|---|
| 7,747,107 B2 | 6/2010 | Avidan et al. | |
| 8,091,021 B2 | 1/2012 | Bargeron et al. | |
| 8,358,876 B1 | 1/2013 | Gilra et al. | |
| 8,805,026 B1* | 8/2014 | Rosenberg | G06K 9/6293 382/112 |
| 2005/0055635 A1 | 3/2005 | Bargeron | |
| 2007/0209025 A1* | 9/2007 | Jing | G06F 17/30265 |
| 2011/0280490 A1 | 11/2011 | Sarkar | |
| 2012/0159314 A1* | 6/2012 | Schrier et al. | G06F 17/00 |

(Continued)

OTHER PUBLICATIONS

Avidan S et al, "Seam Carving for Content-aware Image Resizing", Jul. 2007.

(Continued)

*Primary Examiner* — James J Debrow
(74) *Attorney, Agent, or Firm* — HP Inc. Patent Department

(57) ABSTRACT

Example embodiments relate to automated document composition using quality distributions. In example embodiments, each image in a document is processed by determining quality scores that describe image distortion for potential aspect ratios, determining height deviations for the aspect ratios, and generating quality distributions using the height deviations and quality scores. At this stage, a page template is applied to a subset of elements from the document to render a page of the document, and a page score is determined for the page based on, at least, the quality distribution of an image, where the page template is adjusted to include a selected aspect ratio that maximizes the page score of the page.

14 Claims, 5 Drawing Sheets

(56) References Cited

U.S. PATENT DOCUMENTS

| | | | | |
|---|---|---|---|---|
| 2012/0204098 A1* | 8/2012 | Venkata | ............... | G06F 17/21 |
| | | | | 715/243 |
| 2012/0304042 A1* | 11/2012 | Pereira | ................ | G06F 17/21 |
| | | | | 715/201 |
| 2013/0212471 A1* | 8/2013 | Dannera-Venkata | ..................... | |
| | | | | G06F 17/212 |

OTHER PUBLICATIONS

International Search Report and Written Opinion of the International Searching Authority, dated January03/07/2014 issued in related PCT Application No. PCT/US2013/048727.

Jacobs, C. et al, "Adaptive Grid-based Document Layout", Jul. 2003.

Schrier, Evan et al.. 'Adaptive Layout for Dynamically Aggregated Documents,' . In: IUI '08 Proceedings of the 13th international conference on Intelligent user interfaces New York USA pp. 99-108 Jan. 13, 2008 See pp. 4-5.

Venkata, Niranjan Damera et al., 'Probabilistic Document Model for Automated Document Composition,' , In: DocEng '11 Proceedings of the 11th ACM symposium on Document engineering New York USA.

\* cited by examiner

QUALITY DISTRIBUTIONS FOR AUTOMATED DOCUMENT

BACKGROUND

A mixed-content document can be organized to display a combination of text, images, headers, sidebars, or any other elements that are typically dimensioned and arranged to display information to a reader in a coherent, informative, and visually aesthetic manner. Examples of mixed-content documents include articles, flyers, business cards, newsletters, website displays, brochures, single or multi page advertisements, envelopes, and magazine covers. In recent years, advances in computing devices have accelerated the growth and development of software-based document layout design tools and, as a result, increased the efficiency with which mixed-content documents can be produced. Typical design tools present a document designer with a variety of templates to choose from for each page of the document.

BRIEF DESCRIPTION OF THE DRAWINGS

The following detailed description references the drawings, wherein.

DETAILED DESCRIPTION

As discussed above, designers often use a document designer that provides page templates in order to aesthetically organize mixed content in a document. For example, the document designer may allow a designer to select a page template and then arrange content within the page template to generate a rendering of the document. However, designing documents manually is a time consuming process that is susceptible to errors and oversights. To address this issue, the user may use an automated designing process that includes probabilistic document models to automatically, for example, crop or retarget images based on overall crop probabilities specified by the designer.

Example embodiments disclosed herein provide content aware image layouts for automated document composition. For example, in some embodiments, a computing device processes each image in a document by determining quality scores that describe image distortion for potential aspect ratios, determining height deviations for the aspect ratios, and generating quality distributions using the height deviations and quality scores. At this stage, a page template is applied to a subset of elements from the document to render a page of the document, and a page score is determined for the page based on, at least, the quality distribution of an image, where the page template is adjusted to include a selected aspect ratio that maximizes the page score of the page.

In this manner, example embodiments disclosed herein improve the aesthetics of documents generated using content aware image layouts by measuring how "crop-able" images are and then optimizing the cropping of images across the entire document. Specifically, by generating a quality distribution of quality scores of potential aspect ratios for each span of each image, cropping may be preferred for images that are more crop-able. An image is more crop-able if changing the image's aspect ratio results in less distortion.

Figure 1:
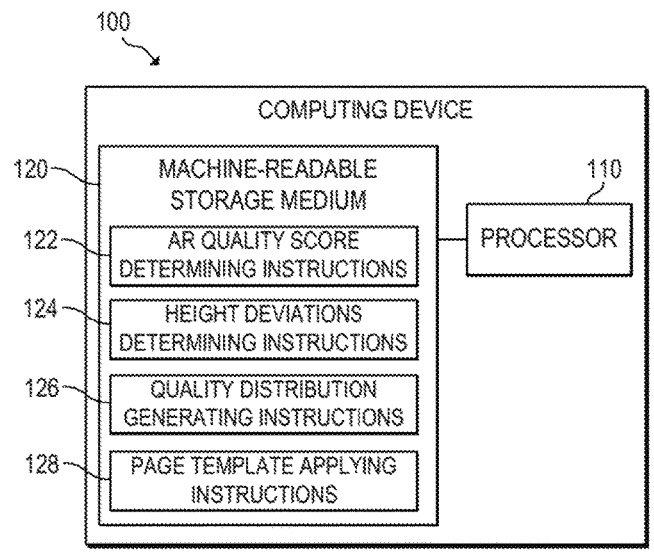
FIG. 1 is a block diagram of an example computing device for performing automated document composition using quality distributions.

Referring now to the drawings, FIG. 1 is a block diagram of an example computing device 100 for automated document composition using quality distributions. Computing device 100 may be, for example, a notebook computer, a desktop computer, an all-in-one system, a tablet computing device, a mobile phone, an electronic book reader, a printing device, or any other electronic device suitable for rendering mixed content in documents. In the embodiment of FIG. 1, computing device 100 includes a processor 110 and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126, 128 to enable automated document composition using quality distributions. As an alternative or in addition to retrieving and executing instructions, processor 110 may include one or more electronic circuits comprising a number of electronic components for performing the functionality of one or more of instructions 122, 124, 126, 128.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for automated document composition using quality distributions.

Aspect ratio quality score determining instructions 122 may determine quality scores for potential aspect ratios of an image. The potential aspect ratios may describe cropped or retargeted versions of the image. The quality score may be calculated based on, for example, distortion of the image caused by a potential aspect ratio. Further, the potential aspect ratios may be varying heights of images for different column spans. In this case, a set of quality scores may be determined for each column span at varying heights.

Distortion and, thus, quality scores of potential aspect ratios of an image may be determined by applying algorithms that detect what has been removed from the image when a potential aspect ratio is applied. For example, objects such as faces, buildings, or landmarks may be detected in the image, where removal of any detected images results in much higher distortion values. Conversely, empty areas of images may be detected such that removal of detected empty areas results in nominal increases in distortion values.

Height deviations determining instructions 124 may determine height deviations for each of the potential aspect ratios analyzed to determine quality scores. Each of the height deviations may be associated with a corresponding potential aspect ratio for later processing. For example, the height deviations may be calculated as the difference between the original height of a rendered image and the modified height in the potential aspect ratio. The rendered image may refer to the image as shown in a rendered document for printing or saving as a document format. In this case, the dimensions of the original image in the mixed content may be measure in pixels while the dimensions of the rendered image may be measured in physical units of length such as inches or centimeters. The rendered image may be scaled from the original image to fit a column span of the rendered document.

Quality distribution generating instructions 126 may generate quality distributions (e.g., crop probability distributions, retarget probability distributions) based on the quality scores and height deviations. For example, each quality distribution may describe the probabilities that height deviations at a particular column span will cause distortion. In this example, a zero value height deviation typically reflects a 0% probability in distortion since the original aspect ratio is maintained. Further, the probability of distortion increases as the height deviation increases; however, the rate at which the probability of distortion increases is dependent on the crop-ability of the image. A quality distribution may be generated for each column span that includes the height deviations determined above plotted with quality scores of the corresponding potential aspect ratios, where the quality scores are inversely related to the probability of distortion (i.e., a higher quality score indicates that there is a low probability of distortion and vice versa).

Page template applying instructions 128 may apply page template to render a document and then optimize the page score of the resulting rendering by using the quality distributions generated above. Specifically, a page score of a page template is maximized by selecting aspect ratios in the quality distributions with the highest possible quality scores while still satisfying the other conditions of the page template.

A page template may have a number of unknown variables associated with, for example, the amount of whitespace and the size of images within a rendered page. When applying a page template and optimizing its page score, the unknown variables of the page template are adjusted while the page score is determined using two factors: (1) a fill score that is penalized based on how well the page is filled (i.e., the fill score is penalized for underlining or overfilling the page) and (2) quality scores of elements in the page (e.g., whitespace, images, etc.) as determined by quality distributions. In this case, the aspect ratios of the images and the whitespace may be varied using the quality distributions until the maximum page score is achieved. Further, the quality distributions allow certain design decisions to be preferred based on, for example, the crop-ability of the images on a page. For example, an image with a quality distribution that show on average lower distortion is preferred for cropping over the other images in the page.

Figure 2:
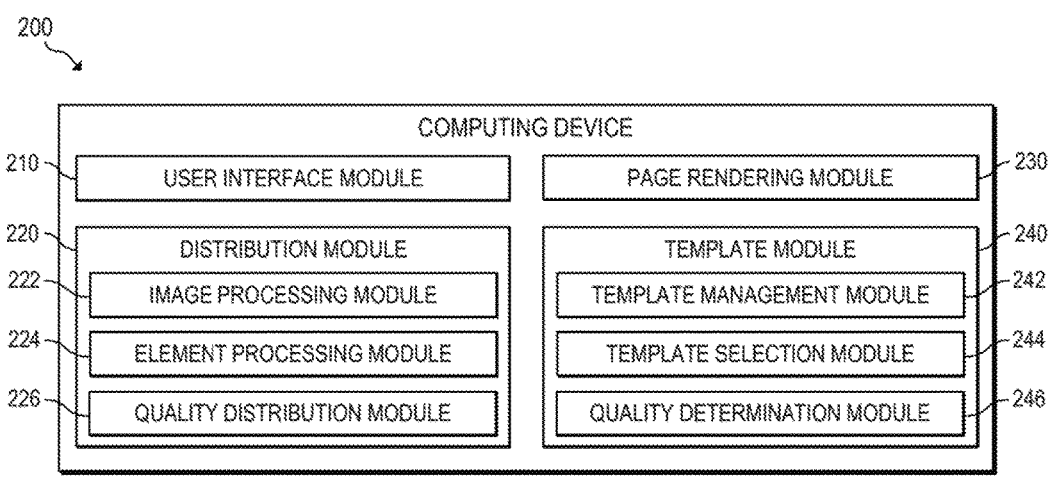
FIG. 2 is a block diagram of an example computing device including modules for performing aspects of automated document composition using quality distributions.

FIG. 2 is a block diagram of an example computing device 200 including modules for performing aspects of automated document composition using quality distributions. As with computing device 100 of FIG. 1, computing device 200 may be any electronic device suitable for processing native documents for production.

As illustrated in FIG. 2 and described in detail below, computing device 200 may also include a number of modules 210-248. Each of the modules may include a series of instructions encoded on a machine-readable storage medium and executable by a processor of computing device 200. In addition or as an alternative, each module 210-248 may include one or more hardware devices comprising electronic circuitry for implementing the functionality described below.

User interface module 210 may display a user interface that allows a designer to access services provided by computing device 200. More specifically, user interface module 210 may provide access to a document designer that accepts inputs from the designer that are used to render documents. For example, the designer may set parameters to be used when applying page templates such as acceptable whitespace thresholds, preferred amount of mixed content per page, or overall precision (i.e., inverse of distortion) that weigh the importance of particular distributions, which are described below, for multiple elements in the document.

Distribution module 220 may process content for building a document model that can be used to perform automated document composition. A document model may include quality distributions for automatically determining the placement of images within page templates. Although the components of distribution module 220 are described in detail below, additional details regarding an example implementation of distribution module 220 are provided above in connection with instructions 122-126 of FIG. 1.

Image processing module 222 may process images in mixed content to determine quality scores for potential aspect ratios. As discussed above with respect to FIG. 1, the quality scores may reflect the amount of distortion caused by applying a potential aspect ratio (e.g., a low amount of distortion will result in a high quality score for a corresponding aspect ratio). Image processing module 222 may also determine the height deviations for each of the potential aspect ratios. The height deviations and corresponding quality scores may then be stored for later use by page rendering module 230 and template module 240.

Element processing module 224 may process non-image elements in mixed content to determine aesthetic scores for various rendering parameters of the non-image elements. For examples, aesthetic scores may be determined for varying widths and heights of a non-image element and for different configurations of whitespace around image elements. The aesthetic scores may then be stored for later use by page rendering module 230 and template module 240.

Quality distribution module 226 may generate distributions (e.g., zero mean normal distributions) for image and non-image elements in a document. Cropping is a process by which outer portions of an image are removed to change the image's aspect ratio. Retargeting is a process by which seams of an image are removed or inserted to change the size of the image, where a seam is a vertical or horizontal path of pixels connected from top to bottom or from left to right, respectively. Quality distributions generated for image elements may be crop probability distributions or retarget probability distributions. The quality scores included in the distributions may be determined by the cropping or retargeting algorithms used to crop or retarget the images. For example, an image may be cropped to each of the potential aspect ratios by a cropping algorithm, where the cropping algorithm provides a quality score as output for each cropped image produced. The cropping algorithm may calculate the quality scores using various procedures such as object recognition, edge detection, or saliency detection.

A crop probability distribution may describe the probabilities of distortion of an image for cropping at various height variances of a particular column span. Quality distribution module 226 may generate multiple crop probability distributions at different column spans for each image in a document. The crop probability distributions may be included in a document model that is used by page rendering module 230 and template module 240. Aesthetic distributions for non-image elements may describe aesthetic scores for various parameters of text fields, whitespaces, etc.

Page rendering module 230 may render pages of a document using page templates. The page templates may be provided by template module 240 as discussed below. Once rendered, a page may be provided to user interface module 210 for viewing by the designer. Further, page rendering module 230 may process the inputs provided to user interface module 210 by the designer to render the pages according to the designees specifications.

Template module 240 may manage and process page templates for use by page rendering module 230. Although the components of template module 240 are described in detail below, additional details regarding an example implementation of template module 240 are provided above in connection with instructions 128 of FIG. 1.

Template management module 242 may allow a designer to create and modify page templates through the user interface module 210. For example, the user interface module 210 may display a template editor in the document designer so that the designer may configure elements included in a page template. The page templates may then be stored for use by the page rendering module 230, which may render mixed content from documents with the page templates. In some cases, the templates may be stored in a markup language such as hypertext markup language (HTML) or extensible markup language (XML).

Template selection module 244 may select templates from the library of stored page templates based on the content that is to be rendered as a page. For example, compatible templates may be determined based on the number of text elements and the number of image elements included in the mixed content for the page. In this example, a template library may be accessed to obtain the page templates that include the appropriate number of text and image elements. Page rendering module 230 may use template selection module 244 to select page templates while rendering mixed content for a page.

Quality determining module 246 may determine quality scores for mixed content applied to a page template. For example, quality determining module 246 may use a document model generated by the distribution module 220 to determine quality scores and aesthetic scores for image elements and non-image elements, respectively, that are rendered using a page layout. In this example, the scores of all the elements in the page may be combined to determine a page more for the mix content rendered in the page layout. For instance, the page score may be determined based on two factors as described above with respect to page template applying instructions 128 of FIG. 1. In some cases, weights may be applied to particular distributions in a document model to increase the importance of corresponding elements in the page score. For example, an image element could be highly weighted over whitespace such that minimizing distortion in the image element is preferred to maintaining whitespace.

Figure 3:
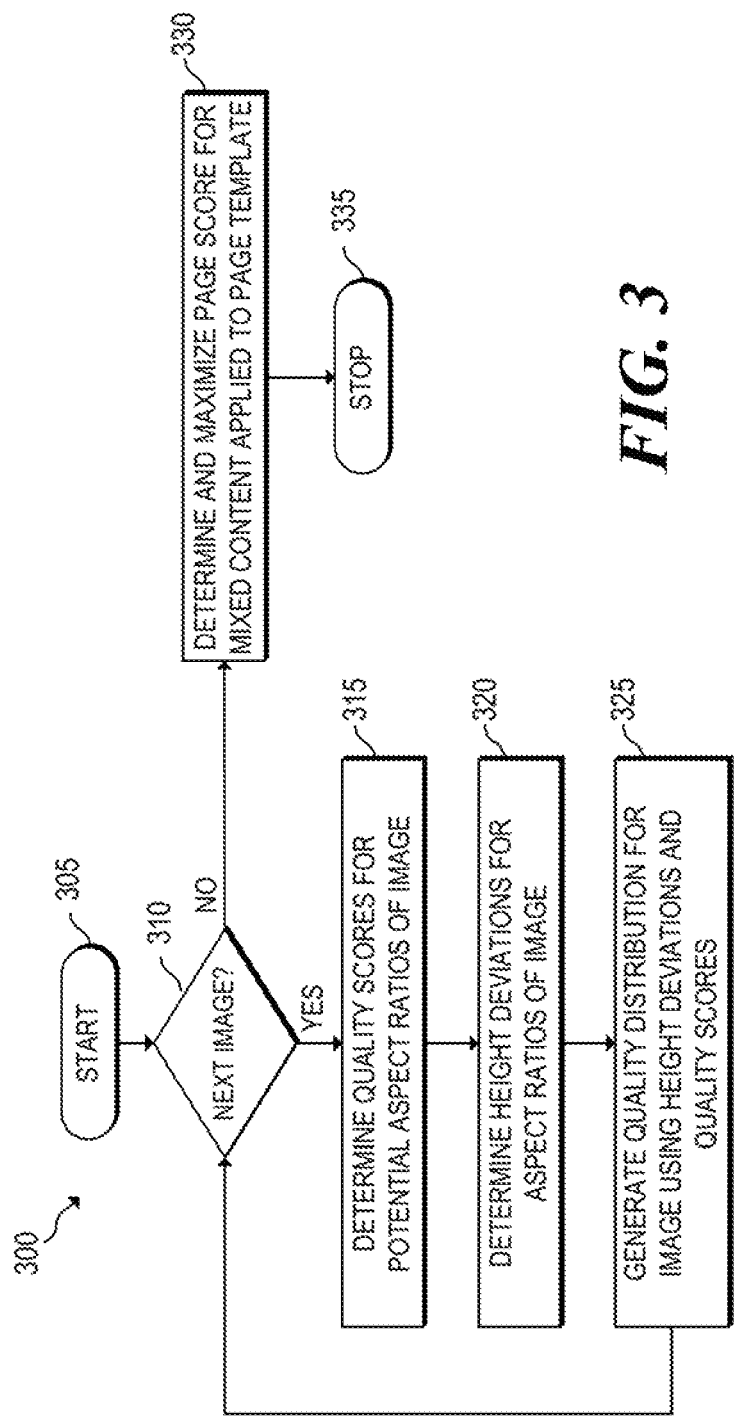
FIG. 3 is a flowchart of an example method for execution by a computing device for determining quality scores of image elements using quality distributions.

FIG. 3 is a flowchart of an example method 300 for execution by a computing device 100 for determining quality scores of image elements using quality distributions. Although execution of method 300 is described below with reference to computing device 100 of FIG. 1, other suitable devices for execution of method 300 may be used such as computing device 200 of FIG. 2. Method 300 may be implemented in the form of executable instructions stored on a machine-readable storage medium, such as storage medium 120, and/or in the form of electronic circuitry.

Method 300 may start in block 305 and continue to block 310, where computing device 100 may process the image elements of a document by determining if there is a next image element to process. If there are no further image elements to process, method 300 proceeds to block 330. If there is a next image element to process, method 300 proceeds to block 315, where computing device 100 determines quality scores for potential aspect ratios of the image element. For example, sets of quality scores may be generated for the image, where each set of quality scores is for varying heights at a different column span.

In block 320, computing device 100 determines the height deviations associated with each of the potential aspect ratios used in block 315. Accordingly, each of the height deviations is associated with a corresponding quality score determined above. A height deviation is the deviation in height from the optimal height (i.e., original height) of the rendered image. In block 325, a quality distribution is generated for the image using the height deviations determined in block 320 and the quality scores determined block 315. For example, a quality distribution may be generated for the image that shows the quality scores across height deviations for a particular column span. In this example, multiple quality distributions may be generated for multiple potential column spans of the image.

Once all the images have been processed, method 300 proceeds to block 330, where computing device 100 uses the quality distribution to determine a page score for mixed content applied to a provided page template. The page score may also be maximized by using the quality distribution to select an aspect ratio for an image element in the page template that has the highest possible quality score while still satisfying the other conditions of the page template. If the page template includes multiple image elements, the page score may be maximized by selecting the best combination of quality scores for the images across the corresponding quality distributions. In this case, cropping images that are more crop-able according to their quality distributions is preferred when applying the page template.

Figure 4:
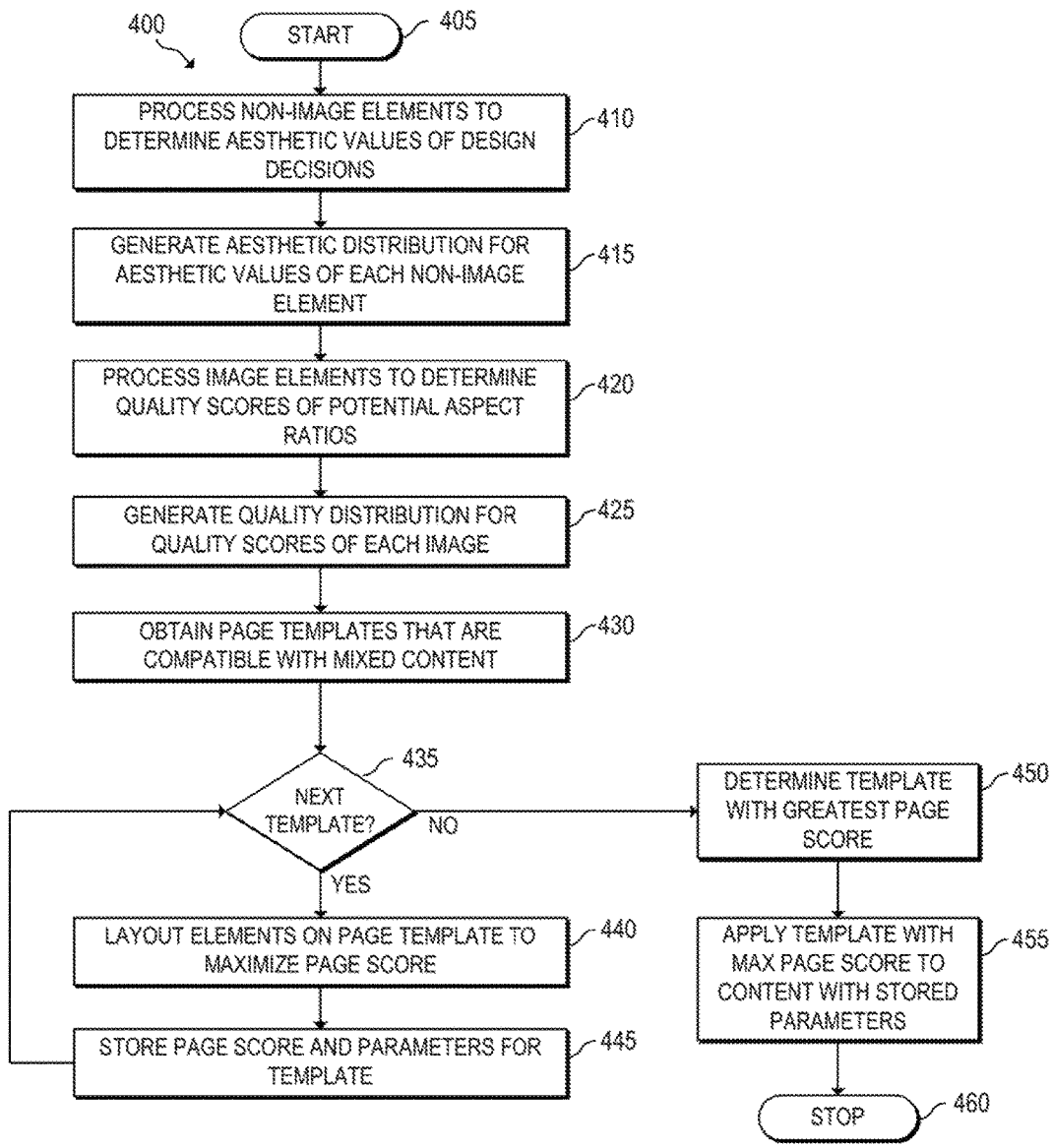
FIG. 4 is a flowchart of an example method for execution by a computing device for performing automated document composition using quality distributions.

FIG. 4 is a flowchart of an example method 400 for execution by a computing device 200 for performing automated document composition using quality distributions. Although execution of method 400 is described below with reference to computing device 200 of FIG. 2, other suitable devices for execution of method 400 may be used, such as computing device 100 of FIG. 1. Method 400 may be implemented in the form of executable instructions stored on a machine-readable storage medium and/or in the form of electronic circuitry.

Method 400 may start in block 405 and proceed to block 410, where computing device 200 may process non-image elements in a document to determine aesthetic values of design decisions. Examples of design decisions may include font selection, line spacing, or text alignment for text elements and amounts of whitespace. In block 415, aesthetic distributions may be generated from the aesthetic values determined in block 410. An aesthetic distribution for a non-image element may show the aesthetic values of the non-image element for varying values of a parameter associated with the non-image element.

In block 420, computing device 200 may process the image elements of the document to determine quality scores for potential aspect ratios of the images. In some cases, quality scores may be determined for each of the images at different column spans. In block 425, quality distributions may be generated from the quality values determined in block 420. A quality distribution for an image element may show the quality values of the image element for varying potential aspect ratios or height deviations of the non-image element.

in block 430, computing device 200 may obtain page templates that are compatible with the mixed content to be rendered in a page. For example, the page templates may be selected from a template library based on the number of image and non-image elements in the mixed content. In block 435, computing device 200 processes the compatible page templates from block 430. If there are no more templates to process, method 400 may proceed to block 450. If there are templates to process, the elements from the mixed content are rendered with the next page template in block 440. A page score may also be determined and optimized for the page using the aesthetic and quality distributions generated above in blocks 415 and 425. In block 445, the optimized page score and the selected parameters from the aesthetic and quality distributions for achieving the optimized page score are stored for later use. At this stage, method 400 returns to block 435 so that the remaining page templates may be processed.

In block 450, computing device 200 determines the page template that resulted in the greatest page score. Once the page template with the greatest page score is determined, computing device 200 applies the page template to the mixed content with the associated stored parameters to render the page in block 455. Method 400 may then proceed to block 460, where method 400 ends.

Figure 5B:
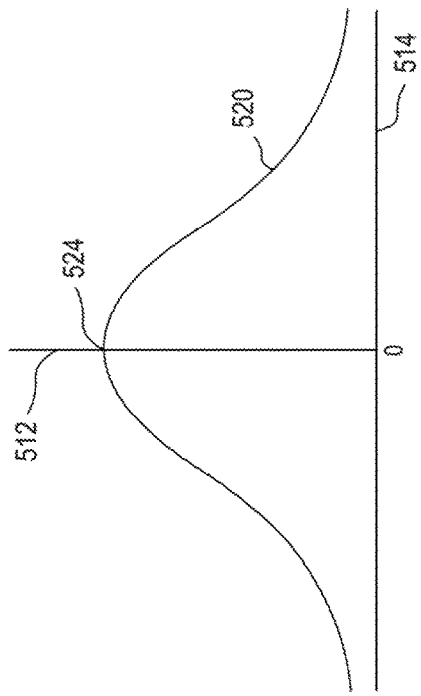
FIGS. 5B and 5C are example vector characterization are example distributions for elements of the template shown in FIG. 5A.
Figure 5C:
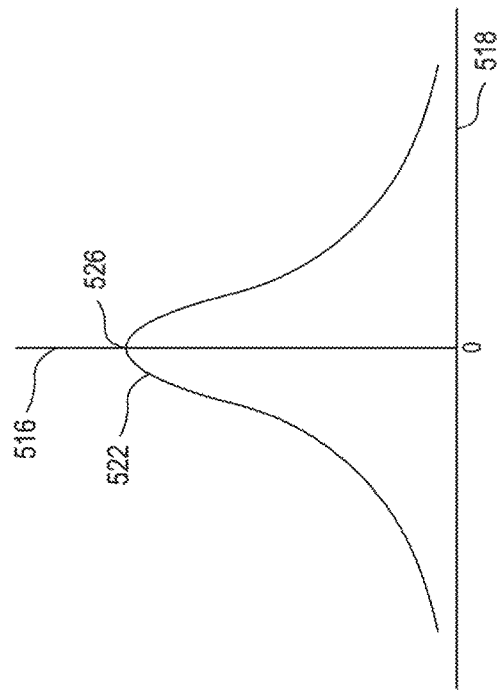
Figure 5A:
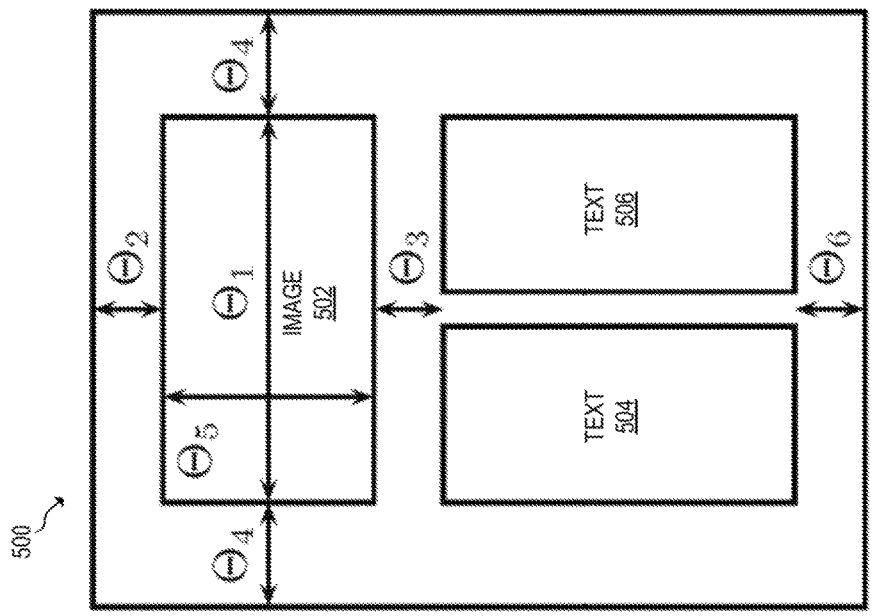
FIG. 5A is an example representation of a single page template with dimensions identified.

FIG. 5A shows an example representation of a page template 500 with identified dimensions. Template 500 includes an image element 502, a first text element 504, and a second text element 506. The template 500 width and height are fixed and top and bottom margins $\Theta_2$ and $\Theta_6$ extending in the x-direction are variable but are subject to minimum value constraints. The dimensions of text fields 504 and 506 are also fixed. As shown in the example of FIG. 5A, the height and width dimensions of an image placed in the image field 502 are represented by $\Theta_5$ and $\Theta_1$, respectively. FIG. 5A also includes side margins of the white space $\Theta_4$ around image element 502, a bottom margin of the white space $\Theta_3$ under image element 502, and a top margin of the white space $\Theta_2$ above image element 502.

The page score of content rendered using template 500 may be maximized within parameters specified by the designer. For example, the designer may specify means, precisions, minimum values, and maximum values for each of the random variables ($\Theta_1$, $\Theta_2$, $\Theta_3$, $\Theta_4$, $\Theta_5$, $\Theta_6$). Distributions may then be used to maximize the page score within the specified configuration of the designer. Linear relationships among variables (i.e., ratios) may also be considered. In this manner, probabilistic distributions may be used in a probabilistic document model to make various conditional design choices more or less probable. In other words, the design choices are modeled jointly as coupled random variables (i.e., a Bayesian Network) with uncertainty modeled by the probabilistic distributions. This process is further described in U.S. Patent Publication US20120204098, which is incorporated in its entirety herein by reference.

In FIG. 5A, image element 502 has variables $\Theta_5$ and $\Theta_1$, where $\Theta_1 = a*\Theta_5$, with precision $\rho$. If the designer wishes for aspect ratio a of image element 502 to remain constant, then $\rho \to \infty$. Conversely, the magnitude of variations allowed in aspect ratio a is dependent on the value of $\rho$ (i.e., small changes allowed for large values of $\rho$ and vice versa).

FIG. 5B shows a quality distribution 520 for the height $\Theta_5$ of image element 502 in FIG. 5A. The y-axis 512 represents quality score, and the x-axis 514 represents height deviation of height $\Theta_5$. The quality distribution 520 has a quality peak 524, where the quality score is 1 and the height deviation is 0 (i.e., the aspect ratio of the image is unchanged). In this example, as the height deviation increases, the quality score slowly decreases in the quality distribution 520.

FIG. 5C shows an aesthetic distribution 522 for the bottom margin of the white space $\Theta_3$ in FIG. 5A. The y-axis 516 represents aesthetic score, and the x-axis 518 represents height deviation of the bottom margin of the white space $\Theta_3$. In this case, the height deviation may be with respect to an optimal height of the bottom margin of the white space $\Theta_3$. The aesthetic distribution 522 has an aesthetic peak 526, where the aesthetic score is 1 and the height deviation is 0 (i.e., the bottom margin is of the optimal height). In this example, as the height deviation increases, the aesthetic score quickly decreases in the aesthetic distribution 522.

The page template 500 of FIG. 5A may be applied to mixed content to generate a rendered page. In this case, variables $\Theta_5$ and $\Theta_3$ may be optimized using quality distribution 520 and aesthetic distribution 522. Because the change in quality score in quality distribution 520 is at a lower rate than the change in aesthetic score in aesthetic distribution 522, changes in the height $\Theta_5$ of image element 502 are preferred over changes in the height $\Theta_3$ of the bottom whitespace. Accordingly, image element 502 may be cropped dramatically while maintaining a relatively high quality score in quality distribution 520, allowing the height $\Theta_3$ of the bottom whitespace to be maintained.

Figure 6:
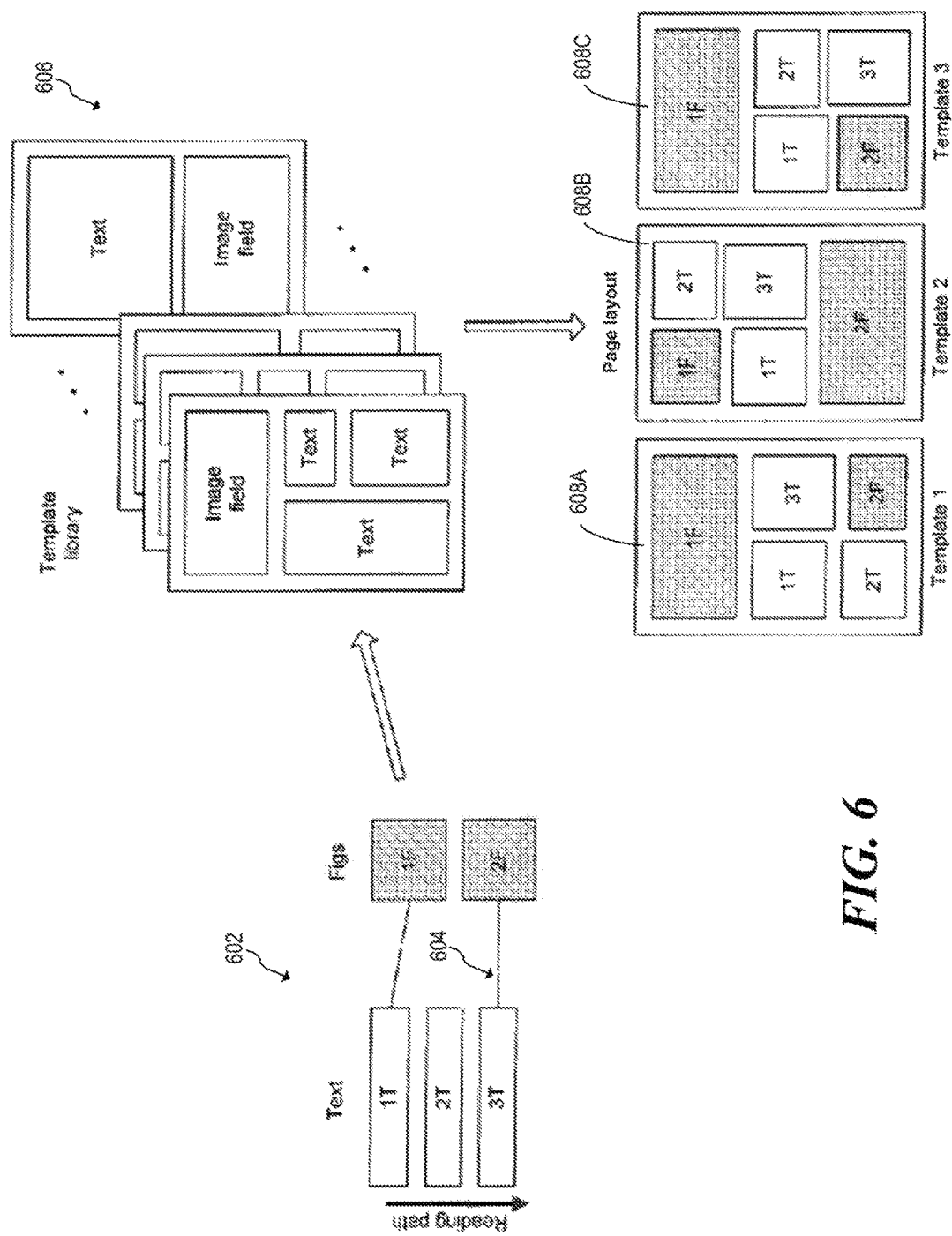
FIG. 6 is a block diagram of an example of generating an optimized page layout from raw input.

FIG. 6 shows an example of generating an optimized page layout from raw input. Raw input 602 comprises text, figures, references, and semantic information. The text portion of the raw input 602 is represented by rectangular blocks labeled 1T-3T, each block representing text such as one or more paragraphs or a heading, and the figures portion of the raw input 602 is represented by squares labeled 1F-2F, each square representing a figure. The raw input 602 also includes semantic information represented by lines extending between text blocks and figures. Semantic information can include which text blocks correspond to headings and which text blocks reference figures. Text block 1T makes reference to FIG. 1F and text block 3T makes reference to FIG. 2F. Semantic information also identifies which text blocks and figures are associated with a reference. For example, reference 604 corresponds to text block 3T and FIG. 2F.

FIG. 6 shows an example of a template library 606 stored in a computer readable medium. There may be a number of templates 608A, 608B, 608C in the template library 606 that can accommodate the text 1T-3T and FIGS. 1F-2F. The optimal template may be determined for the page as described above with respect to FIG. 4. Once an optimal template is determined for the page, an optimal set of template parameters associated with dimensioning and spacing template elements is determined, and the page of the document is rendered.

The foregoing disclosure describes a number of example embodiments for automated document composition by a computing device using quality distributions. In this manner, the embodiments disclosed herein enable automated document composition by using quality distributions to maximize quality scores of image cropping in a document.

We claim:

1. A system for performing automated document composition using quality distributions, the system comprising:
a processor to:
for each image of a plurality of images included in a document:
determine a plurality of quality scores that each describe image distortion for one of a plurality of potential aspect ratios of the image, wherein each of the plurality of potential aspect ratios is determined using one of a plurality of column spans;
determine a plurality of height deviations for the plurality of potential aspect ratios;
generate a quality distribution for the image using the plurality of height deviations and the plurality of quality scores; and
optimize a designer specified variable of the page template based on a comparison of a rate of change in a quality score of the quality distribution of the image and a rate change in an aesthetic score in an aesthetic distribution;
apply a page template to a subset of elements from the document to render a page of the document;
determine a page score for the page based on the quality distribution of at least one of the plurality of images, wherein the page template is adjusted to include a selected aspect ratio of the plurality of potential aspect ratios that maximizes the page score of the page;
repeat application of the page template and determination of the page score for a plurality of page templates that are selected based on a first quantity of image elements and a second quantity of non-image elements in the subset of elements; and
select the page template with a greatest page score.

2. The system of claim 1, wherein the processor is further to select the selected aspect ratio for the image in response to determining that the quality distribution of the image has on average less distortion than another quality distribution of another image.

3. The system of claim 1, wherein the image distortion for one of the plurality of potential aspect ratios is determined based on a first deviation from an optimal image height of the image and a second deviation from an optimal image width of the image.

4. The system of claim 1, wherein the page score for the page is further determined based on a plurality of aesthetic scores for whitespace between elements in the page, wherein the elements in the page include at least one the plurality of images.

5. The system of claim 4, wherein the processor is further to receive a request to prefer the quality distribution over an aesthetic distribution of the whitespace, wherein the preference increases a weight of a selected quality score from the quality distribution in determining the page score for the subset of elements.

6. A method for performing automated document composition using quality distributions, the method comprising:
for each image of a plurality of images included in a document:
determining a plurality of quality scores that each describe image distortion for one of a plurality of potential aspect ratios of the image, wherein each of the plurality of potential aspect ratios is determined using one of a plurality of column spans;
determining a plurality of height deviations for the plurality of potential aspect ratios; and
generating a quality distribution for the image using the plurality of height deviations and the plurality of quality scores; and
optimize a designer specified variable of the page template based on a comparison of a rate of change in a quality score of the quality distribution of the image and a rate change in an aesthetic score in an aesthetic distribution;
applying a page template of a plurality of page templates to a subset of elements from the document to render a page of the document, wherein the plurality of page templates are selected based on a first quantity of image elements and a second quantity non-image elements in the subset of elements;
determining the page score for the page based on the quality distribution of at least one of the plurality of images, wherein the page template is adjusted to include a selected aspect ratio of the plurality of potential aspect ratios that maximizes the page score of the page;
repeating the applying and the determining for a plurality of page templates that are selected based on a first quantity of image elements and a second quantity of non-image elements in the subset of elements; and
selecting the page template with a greatest page score.

7. The method of claim 6, further comprising selecting the selected aspect ratio for the image in response to determining that the quality distribution of the image has on average less distortion than another quality distribution of another image.

8. The method of claim 6, wherein the image distortion for one of the plurality of potential aspect ratios is determined based on a first deviation from an optimal image height of the image and a second deviation from an optimal image width of the image.

9. The method of claim 6, wherein the page score for the page is further determined based on a plurality of aesthetic scores for whitespace between elements in the page, wherein the elements in the page include at least one the plurality of images.

10. The method of claim 9, further comprising receiving a request to prefer the quality distribution over an aesthetic distribution of the whitespace, wherein the preference increases a weight of a selected quality score from the quality distribution in determining the page score for the subset of elements.

11. A non-transitory machine-readable storage medium encoded with instructions executable by a processor for performing automated document composition using quality distributions, the machine-readable storage medium comprising instructions to:
for each image of a plurality of images included in a document:
determine a plurality of quality scores that each describe image distortion for one of a plurality of potential aspect ratios of the image, wherein each of the plurality of potential aspect ratios is determined using one of a plurality of column spans;
determine a plurality of height deviations for the plurality of potential aspect ratios;
generate a quality distribution for the image using the plurality of height deviations and the plurality of quality scores; and optimize a designer specified variable of the page template based on a comparison of a rate of change in a quality score of the quality distribution of the image and a rate change in an aesthetic score in an aesthetic distribution;

apply a page template of a plurality of page templates to a subset of elements from the document to render a page of the document, wherein the plurality of page templates are selected based on a first quantity of image elements and a second quantity non-image elements in the subset of elements;

determine the page score for the page based on the quality distribution of at least one of the plurality of images, wherein the page template is adjusted to include a selected aspect ratio of the plurality of potential aspect ratios that maximizes the page score of the page;

repeat application of the page template and determination of the page score for a plurality of page templates that are selected based on a first quantity of image elements and a second quantity of non-image elements in the subset of elements; and select the page template with a greatest page score.

12. The storage medium of claim 11, further comprising instructions to select the selected aspect ratio for the image in response to determining that the quality distribution of the image has on average less distortion than another quality distribution of another image.

13. The storage medium of claim 11, wherein the page score for the page is further determined based on a plurality of aesthetic scores for whitespace between elements in the page, wherein the elements in the page include at least one the plurality of images.

14. The storage medium of claim 13, further comprising instructions to receive a request to prefer the quality distribution over an aesthetic distribution of the whitespace, wherein the preference increases a weight of a selected quality score from the quality distribution in determining the page score for the subset of elements.

* * * * *